(12) United States Patent
Kim

(10) Patent No.: US 10,165,173 B2
(45) Date of Patent: Dec. 25, 2018

(54) OPERATING METHOD AND APPARATUS FOR DETACHABLE LENS TYPE CAMERA

(71) Applicant: Samsung Electronics Co., Ltd., Suwon-si, Gyeonggi-do (KR)

(72) Inventor: Dong-Han Kim, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/030,791

(22) PCT Filed: Oct. 21, 2014

(86) PCT No.: PCT/KR2014/009866
§ 371 (c)(1),
(2) Date: Apr. 20, 2016

(87) PCT Pub. No.: WO2015/060605
PCT Pub. Date: Apr. 30, 2015

(65) Prior Publication Data
US 2016/0255265 A1 Sep. 1, 2016

(30) Foreign Application Priority Data
Oct. 21, 2013 (KR) .................. 10-2013-0125493

(51) Int. Cl.
*H04N 5/232* (2006.01)
*H04N 5/225* (2006.01)

(52) U.S. Cl.
CPC ....... *H04N 5/23209* (2013.01); *H04N 5/2253* (2013.01); *H04N 5/2254* (2013.01); *H04N 5/23206* (2013.01)

(58) Field of Classification Search
CPC ............ H04N 5/23209; H04N 5/2253; H04N 5/2254; H04N 5/23206
See application file for complete search history.

(56) References Cited

U.S. PATENT DOCUMENTS

| 2003/0137588 A1 | 7/2003 | Wang et al. |
| 2005/0174434 A1 | 8/2005 | Chang et al. |

(Continued)

FOREIGN PATENT DOCUMENTS

| JP | 2010-109477 A | 5/2010 |
| JP | 2011259065 A | 12/2011 |
| KR | 10-2013-0061511 A | 6/2013 |

OTHER PUBLICATIONS

Concept Camera, Artefact, released in 2010, www.artefactgroup.com/wvil.

(Continued)

*Primary Examiner* — Nelson D. Hernández Hernández
(74) *Attorney, Agent, or Firm* — Jefferson IP Law, LLP

(57) ABSTRACT

Embodiments of the present invention provide an operating method and apparatus for a detachable lens type camera system which is suitable for photographing a picture or a video having high definition. According to an embodiment of the present invention, a camera system comprises: a body; and a lens part which can be detachably mounted to the body and can be wirelessly connected to the body. The lens part estimates location information between the lens part and the body using beam information of the lens part and beam information of the body, which are formed by beam-forming, and applies the estimated location information to photographing.

20 Claims, 17 Drawing Sheets

(56) References Cited

U.S. PATENT DOCUMENTS

| | | |
|---|---|---|
| 2005/0212954 A1* | 9/2005 | Senba .................. H04N 5/2251 |
| | | 348/360 |
| 2006/0023070 A1 | 2/2006 | Nakamura et al. |
| 2007/0126883 A1 | 6/2007 | Ishige et al. |
| 2007/0147815 A1 | 6/2007 | Tanaka |
| 2010/0073492 A1* | 3/2010 | Kudo .................... H04N 5/2171 |
| | | 348/208.1 |
| 2010/0177198 A1 | 7/2010 | Hayashi et al. |
| 2010/0295963 A1 | 11/2010 | Shintani |
| 2011/0019985 A1 | 1/2011 | Chiu et al. |
| 2011/0102668 A1 | 5/2011 | Kaga et al. |
| 2012/0127319 A1* | 5/2012 | Rao .................... H04N 5/23206 |
| | | 348/169 |
| 2013/0128046 A1 | 5/2013 | Gindin |
| 2013/0141640 A1 | 6/2013 | Kim et al. |
| 2014/0253742 A1* | 9/2014 | Ishii ................... H04N 5/23245 |
| | | 348/207.1 |

OTHER PUBLICATIONS

Zach Honig, Sony Cyber-shot QX10 review: a WiFi 'lens camera' that mounts directly on your smartphone, www.engadget.com/2013/09/18/sony-dx10-review/.

* cited by examiner

OPERATING METHOD AND APPARATUS FOR DETACHABLE LENS TYPE CAMERA

TECHNICAL FIELD OF THE INVENTION

The present disclosure relates to an interchangeable-lens camera.

BACKGROUND OF THE INVENTION

With the recent development of communication technologies, an interchangeable-lens camera (or a camera with an interchangeable lens) has been released. The interchangeable-lens camera supports a wireless connection function so that the photographing of a picture or video image is enabled even when a main body and a lens unit are physically separated from each other. The main body and the lens unit are provided with a wireless module therein for a wireless connection therebetween. In such an interchangeable-lens camera, photographing shall be enabled in the state where the main body and the lens unit are separated from each other.

DISCLOSURE OF INVENTION

Technical Problem of the Invention

Accordingly, embodiments of the present disclosure are to provide an operating method and apparatus for an interchangeable-lens camera system, which are suitable for photographing a high-definition picture or video image.

Other embodiments of the present disclosure are to provide an operating method and apparatus for an interchangeable-lens camera system, which are suitable for photographing while in a state where a camera body and a lens unit are separated from each other.

In a case where a picture or video image is photographed by an interchangeable-lens camera system in a state where a camera body and a lens unit are separated from each other, still other embodiments of the present disclosure are to provide a method and apparatus for measuring a moving trace of the camera body and/or the lens unit and converting photographed image data by using a measured result.

Still other embodiments of the present disclosure are to provide a composition control method and apparatus that are suitable in a case where a picture or video image is photographed by an interchangeable-lens camera system while in a state where a camera body and a lens unit are separated from each other.

Yet other embodiments of the present disclosure are to provide a zoom-in/out processing method and apparatus that are suitable in a case where a picture or video image is photographed by an interchangeable-lens camera system while in a state where a camera body and a lens unit are separated from each other.

Solution to Problem of the Invention

According to one embodiment of the present disclosure, there is provided a method of operating a lens unit in a camera system that includes a main body and a lens unit configured to be detachably mounted on the main body and wirelessly connected to the main body. The lens unit operating method includes: acquiring a moving trace of at least one of the lens unit and the main body; and converting photographed image data based on the acquired moving trace.

According to another embodiment of the present disclosure, there is provided a lens unit in a camera system that includes a main body and a lens unit configured to be detachably mounted on the main body and wirelessly connected to the main body. The lens unit includes: a moving trace acquisition device configured to acquire a moving trace of at least one of the lens unit and the main body; and a controller configured to convert photographed image data based on the acquired moving trace.

According to still another embodiment of the present disclosure, there is provided a main body operating method in a camera system that includes a main body and a lens unit configured to be detachably mounted on the main body and wirelessly connected to the main body. The main body operating method includes: acquiring a moving trace of the main body; and transmitting information for the acquired moving trace to the lens unit so as to cause a photographed image data conversion operation to be performed based on the moving trace information by the lens unit.

According to still another embodiment of the present disclosure, there is provided a main body in a camera system that includes a main body and a lens unit configured to be detachably mounted on the main body and wirelessly connected to the main body. The main body includes: a moving trace acquisition device configured to acquire a moving trace of the main body; and a wireless module configured to transmit information for the acquired moving trace to the lens unit so as to cause a photographed image data conversion operation to be performed based on the moving trace information by the lens unit.

Advantageous Effects

According to the embodiments of the present disclosure, a photographing composition of a picture or video image can be efficiently changed by using the main body when photographing the picture or video image even if the wireless lens unit and the main body are separated from each other. In addition, zoom-in/out can be easily implemented by moving the main body forward/backward.

BRIEF DESCRIPTION OF THE DRAWINGS

In order to give a more complete understanding of the present disclosure and the effects thereof, the following description will be made with reference to the accompanying drawings in which similar components will be denoted by similar reference numerals.

DETAILED DESCRIPTION OF THE INVENTION

FIGS. 1 to 14 to be used herein for describing principles of the present disclosure are only illustrative and shall not be interpreted as limiting the scope of the present disclosure in any way. A person ordinarily skilled in the art may understand that the principles of the present disclosure may also be implemented in any wireless communication system by being properly arranged therein.

Figure 1A:
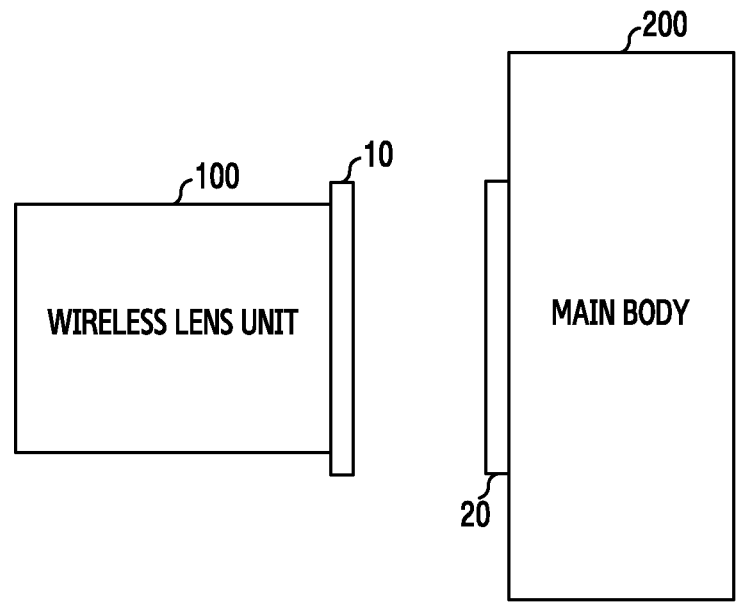
FIG. 1 is a view illustrating a connection configuration of an interchangeable-lens camera system to which the present disclosure is applied.
Figure 1B:
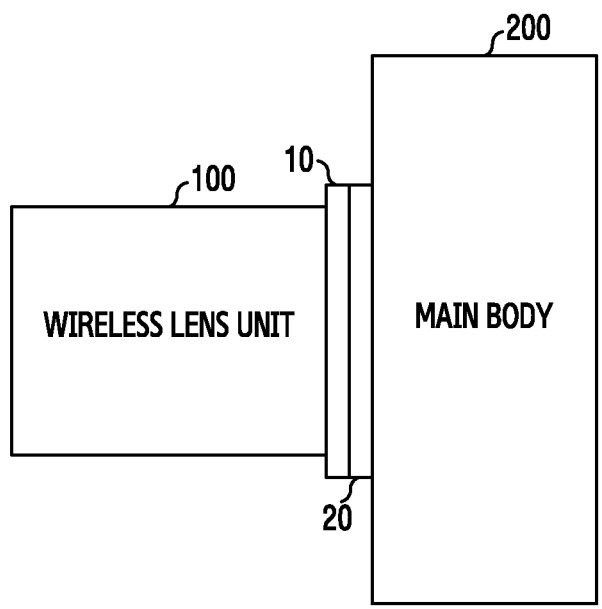

The embodiments of the present disclosure to be described below are related to an interchangeable-lens camera in which a wireless lens unit and a main body are separable from each other. As illustrated in FIG. 1, an interchangeable-lens camera includes a wireless lens unit 100 and a main body 200. The wireless lens unit 100 and the main body 200 may be connected to each other through wireless modules provided therein so as to transmit a control signal and data therebetween. Thus, the wireless lens unit 100 and the main body 200 enable the photographing of a picture or video image, not only in a state where the wireless lens unit 100 and the main body 200 are coupled to each other through mounts 10 and 20 thereof (FIG. 1(a)), but also in a state where the wireless lens unit 100 and the main body 200 are separated from each other (FIG. 1(b)). In another embodiment, the wireless lens unit 100 may be paired with a device that is provided with a display and has a wireless connection function (e.g., a smart phone, a TV, a laptop PC, or a tablet PC). Such a device may be paired with a smart camera that includes a wireless module.

In order to ensure that the camera body 200 and the wireless lens unit 100 are wirelessly connected to each other so as to enable the photographing of a picture and a lens control, the main body 200 and the lens unit 100 should include a wireless module therein. Here, it is necessary to determine the wireless module in consideration of a bandwidth of a picture or video image to be exchanged between the lens unit 100 and the main body 200. For example, as the wireless module, a millimeter wave type, an IEEE 802.11ac type, or the like may be used. Such a wireless module is a Giga-bps grade wireless module, and is suitable for transmitting a picture or video image with high image quality in the case where a photographed picture or video image has high image quality in a high/ultra-definition grade. As another example, a Wireless Fidelity (WiFi) type may be used as the wireless module. In a case where a picture or video image is transmitted from the interchangeable-lens camera in a compressed state, a large bandwidth is not required so that WiFi may be used as a wireless link. As another example, a Wideband Code Division Multiple Access (WCDMA) type, a Long Term Evolution (LTE), or a Bluetooth type may be used as the wireless module.

Figure 2A:
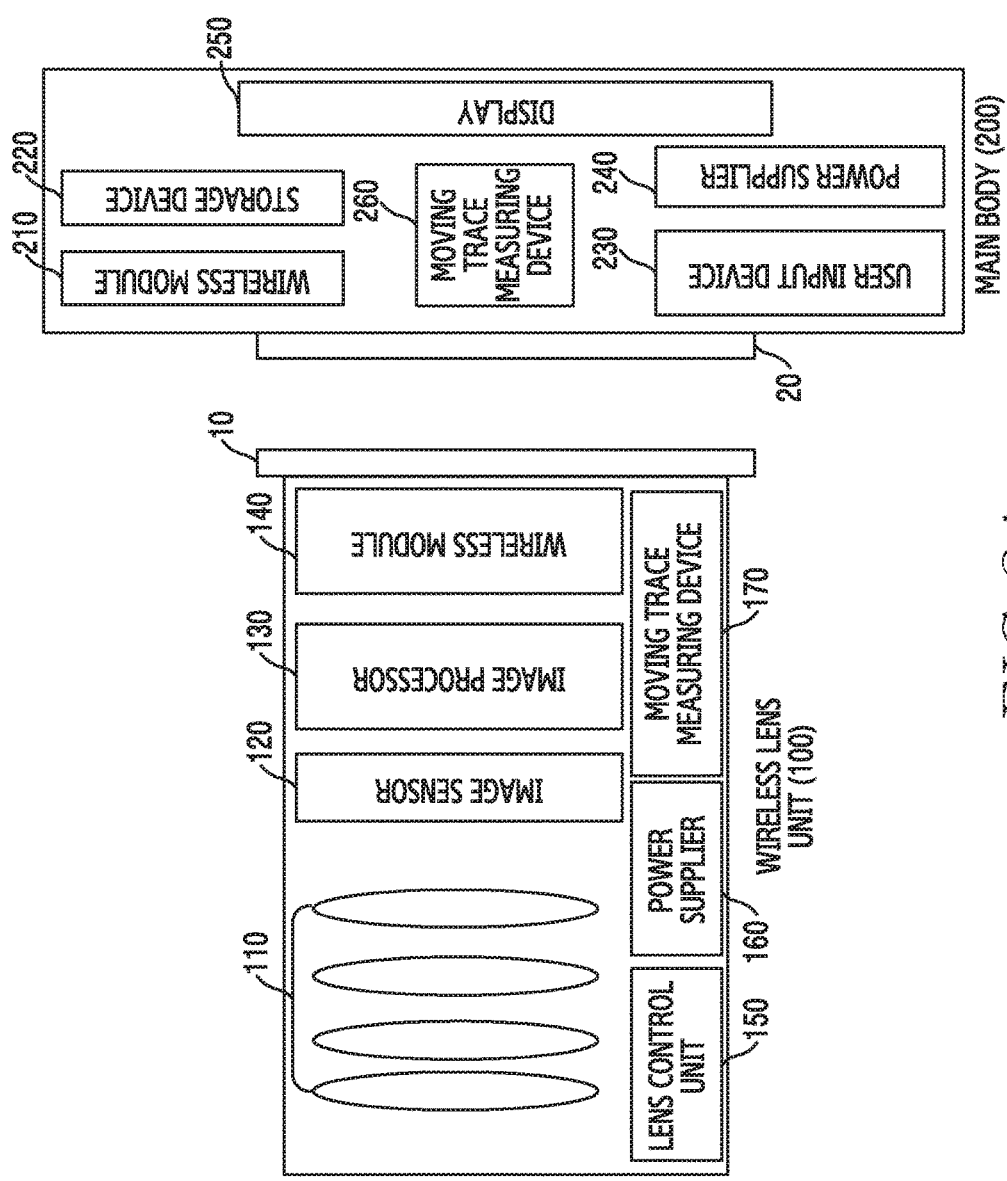
FIG. 2A is a view illustrating a configuration of a wireless lens unit and a main body that constitute an interchangeable-lens camera system according to one embodiment of the present disclosure.

FIG. 2A is a view illustrating a configuration of a wireless lens unit 100 and a main body 200 that constitute an interchangeable-lens camera system according to one embodiment of the present disclosure. The configuration illustrated in FIG. 2A is illustrative only, and other configurations may be used without departing from the scope of the present disclosure.

Referring to FIG. 2A, the wireless lens unit 100 and the main body 200 include mounts 10 and 20, respectively. The wireless lens unit 100 and the main body 200 may be coupled to or separated from each other through the mounts 10 and 20. In order to enable photographing of a picture or video image even in the state where the wireless lens unit 100 and the main body 200 are separated from each other, wireless modules 140 and 210 configured to wirelessly interconnect the wireless lens unit 100 and the main body 200 are included within the wireless lens unit 100 and the main body 200, respectively.

The wireless lens unit 100 includes a plurality of lenses 110, an image sensor 120, an image processor 130, a wireless module 140, a lens controller 150, a power supplier 160, and a moving trace measuring device 170. The power supplier 160 supplies power to each of the components of the wireless lens unit 100. The lens controller 150 controls the setting of the lenses 110 for the photographing of a picture or video image. For example, the lens controller 150 controls auto-focus, zoom, iris, or the like. The image sensor 120 converts a light received through the lenses 110 into an electric signal. The image processor 130 performs image processing. For example, the image processor 130 removes noise from data received from the image sensor 120 and converts the data to be suitable for a picture or video image format. Here, the image processor 130 converts photographed image data received from the image sensor 120 according to a moving trace of the lens unit 100 and/or the main body 200. According to one embodiment, the image processor 130 rotates the photographed image data received from the image sensor 120 according to a rotating inclination of the lens unit 100 and/or the main body 200. According to another embodiment, the image processor 130 zooms in/out the photographed image data received from the image sensor 120 according to forward/backward moving information of the main body 200.

The moving trace measuring device 170 measures a moving trace of the lens unit 100. For example, the moving trace measuring device 170 measures the rotating inclination of the lens unit 100. For this purpose, the moving trace measuring device 170 may include a gyroscope sensor. The wireless module 140 transmits image data of a picture or video image, which was photographed by the lenses 110 and then processed by the image processor 130, to the main body 200. In addition, the wireless module 140 receives, from the main body 200, the moving trace information of the main body 200 measured by the main body 200. For example, the moving trace information of the main body 200 includes rotating inclination information of the main body. As another example, the moving trace information of the main body 200 includes forward/backward moving information of the main body.

The main body 200 includes a wireless module 210, a storage device 220, a user input device 230, a power supplier 240, a display 250, and a moving trace measuring device 260. The wireless module 210 receives image data of a picture or video image transmitted from the wireless lens unit 100. In addition, the wireless module 210 transmits, to the lens unit 100, the moving trace information of the main body 200 measured by the moving trace measuring device 260. For example, the moving trace information of the main body 200 includes rotating inclination information of the main body. As another example, the moving trace information of the main body 200 includes forward/backward moving information of the main body. For this purpose, the moving trace measuring device 260 includes a gyroscope sensor and an acceleration sensor, and may measure the trace of the direction, movement, or the like of the main body 200.

The storage device 220 stores the image data of the picture or video image. The display 250 displays the picture or video image such that the user may preview/review the picture or video image. The user input device 230 is provided to allow the user to make an input. For example, the user input device 230 may include a button and a dial for user input, and the display 250 may include a touch screen function for user input.

The wireless modules 140 and 210, which are respectively included in the wireless lens unit 100 and the main body 200, are provided for signal transfer between the wireless lens unit 100 and the main body 200. For example, the wireless modules 140 and 210 transmit image data photographed by the wireless lens unit 100 to the main body 200. As another example, the wireless modules 140 and 210 transmit information for the moving trace measured by the main body 200 to the wireless lens unit 100. In one embodiment, the wireless modules 140 and 210 may be Giga-bps grade wireless modules of a millimeter wave type or an IEEE 802.11ac type. In another embodiment, the wireless modules may use any one of WiFi, WCDMA, LTE, and Bluetooth.

Figure 2B:
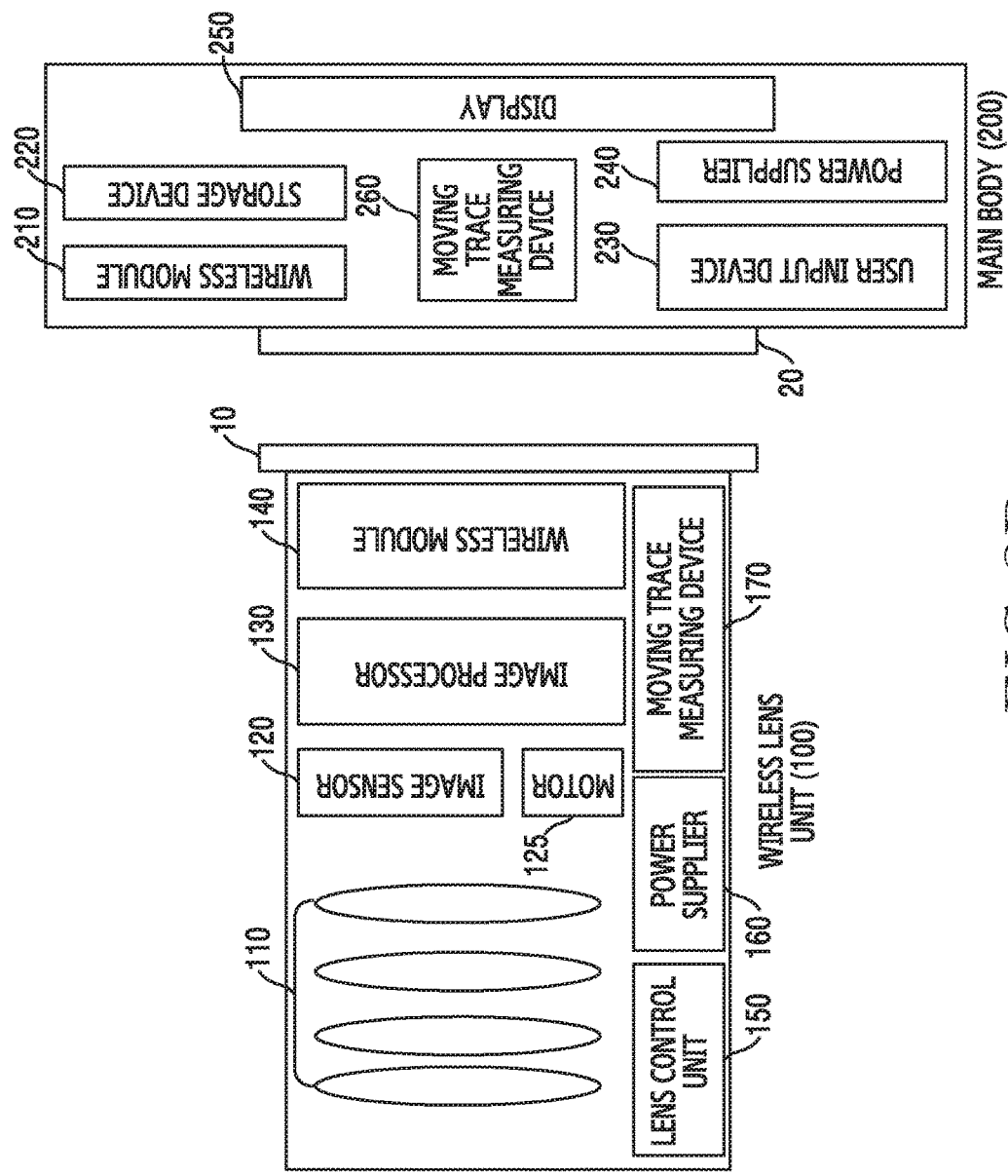
FIG. 2B is a view illustrating a configuration of a wireless lens unit and a main body that constitute an interchangeable-lens camera system according to another embodiment of the present disclosure.

FIG. 2B is a view illustrating a configuration of a wireless lens unit 100 and a main body 200 that constitute an interchangeable-lens camera system according to another embodiment of the present disclosure. The configuration illustrated in FIG. 2B is illustrative only, and other configurations may be used without departing from the scope of the present disclosure.

Referring to FIG. 2B, the wireless lens unit 100 includes a plurality of lenses 110, an image sensor 120, a motor 125, an image processor 130, a wireless module 140, a lens controller 150, a power supplier 160, and a moving trace measuring device 170. When comparing with FIG. 2A, the wireless lens unit 100 illustrated in FIG. 2B further includes a motor 125. The motor 125 is implemented in the form of mechanically rotating the image sensor 120. For example, the motor 125 may be implemented by an ultrasonic motor that is constituted by being connected to the image sensor 120.

As described above, an interchangeable-lens camera according to an embodiment of the present disclosure may be used in a state where the wireless lens unit 100 and the main body 200 are coupled to each other. In such a case, the user may adjust the composition at the time of photographing in a portrait mode, a landscape mode, or an arbitrary mode as desired, by adjusting the main body by a desired angle while viewing the display 250 of the main body 200 or a viewfinder (not illustrated). In addition, in the case where the wireless lens unit 100 and the main body 200 are coupled to each other, the user may easily adjust the focal distance of the lenses.

Meanwhile, in order to adjust the composition for photographing a picture or video image in the state where the wireless lens unit 100 and the main body 200 are separated from each other, it is necessary to rotate the lens unit 100, instead of rotating the main body 200. However, in a case where the lens unit 100 is distant from the user or is not adjustable, it is not easy to perform the composition adjustment, a zoom-in/out adjustment, or the like. Accordingly, various embodiments of the present disclosure propose a method of efficiently controlling a picture or video image by using the main body 200 even in the case where the wireless lens unit 100 and the main body 200 are separated from each other in the interchangeable-lens camera. For this purpose, the wireless lens unit 100 and the main body 200 may include a gyro sensor and an acceleration sensor to measure a moving trace. Various embodiments of the present disclosure may perform a desired composition setting, a focal distance change, an optical/digital zoom processing by exchanging, through a wireless link, the moving trace information of the main body 200 and the moving trace information of the lens unit 100, which have been measured by sensors.

According to the embodiments of the present disclosure to be described later, the wireless lens unit and the main body in an interchangeable-lens camera are provided with a moving trace measuring device, such as a gyroscope sensor or an acceleration sensor, so as to determine a moving trace, such as an inclination, a rotation, or a forward/backward movement. The wireless lens unit or the main body transfers moving trace information measured by the moving trace measuring device to the counterpart through a wireless link. The wireless lens unit or the main body combines the received trace information of the counterpart so as to determine whether to rotate, magnify, or minify the image data of a photographed picture or video image, and reflects the determination on the photographing of a picture or a video image. According to one embodiment, when the main body is rotated vertically, horizontally, or with an arbitrary inclination in the state where the wireless lens unit and the main body are separated from each other, the moving trace measuring device of the main body measures the moving trace information of the main body and transmits the moving trace information to the wireless lens unit. Then, the wireless lens unit also rotates a preview video image, a photographed image, or the like vertically, horizontally, or with an arbitrary inclination, similar to the main body. According to another embodiment, when the main body is moved forward/backward in the state where the wireless lens unit and the main body are separated from each other, the moving trace measuring device of the main body measures the moving trace information of the main body and transmits the moving trace information to the wireless lens unit. Then, the wireless lens unit adjusts the focal distance of the lenses according to the movement of the main body, and zooms in/out the photographed image data. Thus, according to the embodiments of the present disclosure, a photographing composition of a picture or video image can be efficiently changed by using the main body when photographing the picture or video image even if the wireless lens unit and the main body are separated from each other. In addition, zoom-in/out can be easily implemented by moving the main body forward or backward.

Figure 3:
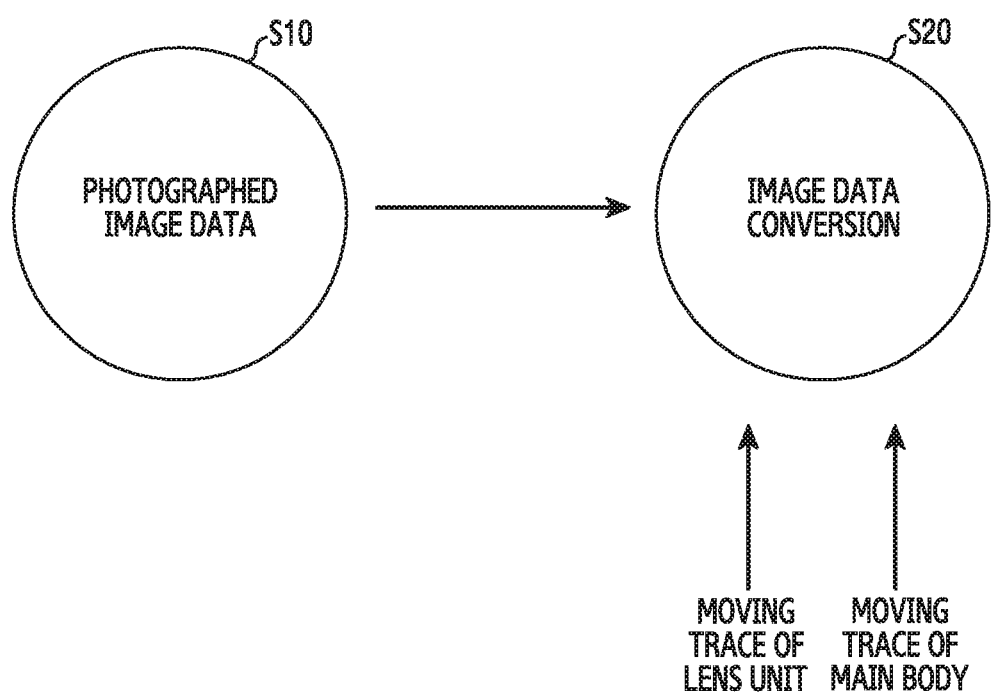
FIG. 3 is a view illustrating an operation of an interchangeable-lens camera system according to embodiments of the present disclosure.

FIG. 3 is a view illustrating an operation of an interchangeable-lens camera system according to embodiments of the present disclosure. Such an operation is performed by the image processor 130 illustrated in FIGS. 2a and 2b.

Referring to FIG. 3, the image processor 130 receives photographed image data from the image sensor 120 at step S10. The image processor 130 converts the received photographed image data at step S20. For example, the image processor 130 converts the image data according to the moving trace of the lens unit 100 and the moving trace of the main body 200. The moving trace of the lens unit 100 is measured by the moving trace measuring device 170. The moving trace of the main body 200 is measured by the moving trace measuring device 260, and the information for the measured moving trace of the main body 200 is transmitted through the wireless module 210 of the main body 200 and then received by the wireless module 140 of the lens unit 100.

Figure 4A:
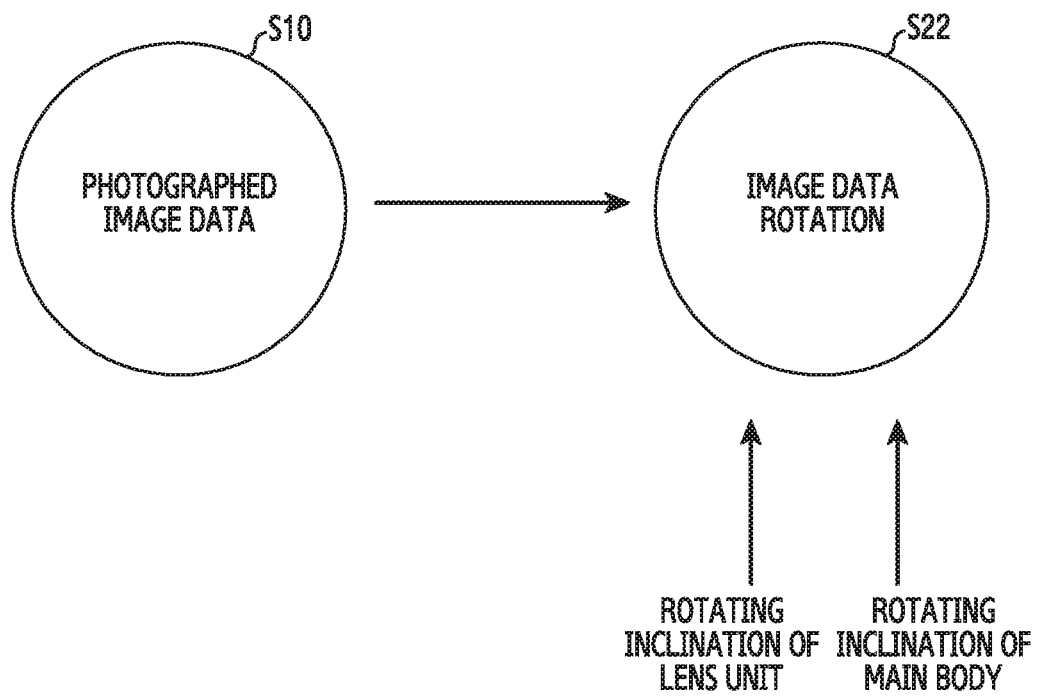
FIG. 4A is a view illustrating an operation of an interchangeable-lens camera system according to one embodiment of the present disclosure.

FIG. 4A is a view illustrating an operation of an interchangeable-lens camera system according to one embodiment of the present disclosure. Such an operation is performed by the image processor 130 illustrated in FIGS. 2a and 2b.

Referring to FIG. 4A, the image processor 130 receives photographed image data from the image sensor 120 at S10. The image processor 130 rotates the received photographed image data at step S22. For example, the image processor 130 rotates the image data according to the rotating inclination of the lens unit 100 and the rotating inclination of the main body 200. The rotating inclination of the lens unit 100 is measured by the moving trace measuring device 170. The rotating inclination of the main body 200 is measured by the moving trace measuring device 260, and the information for the measured rotating inclination of the main body 200 is transmitted through the wireless module 210 of the main body 200 and then received by the wireless module 140 of the lens unit 100.

Figure 4B:
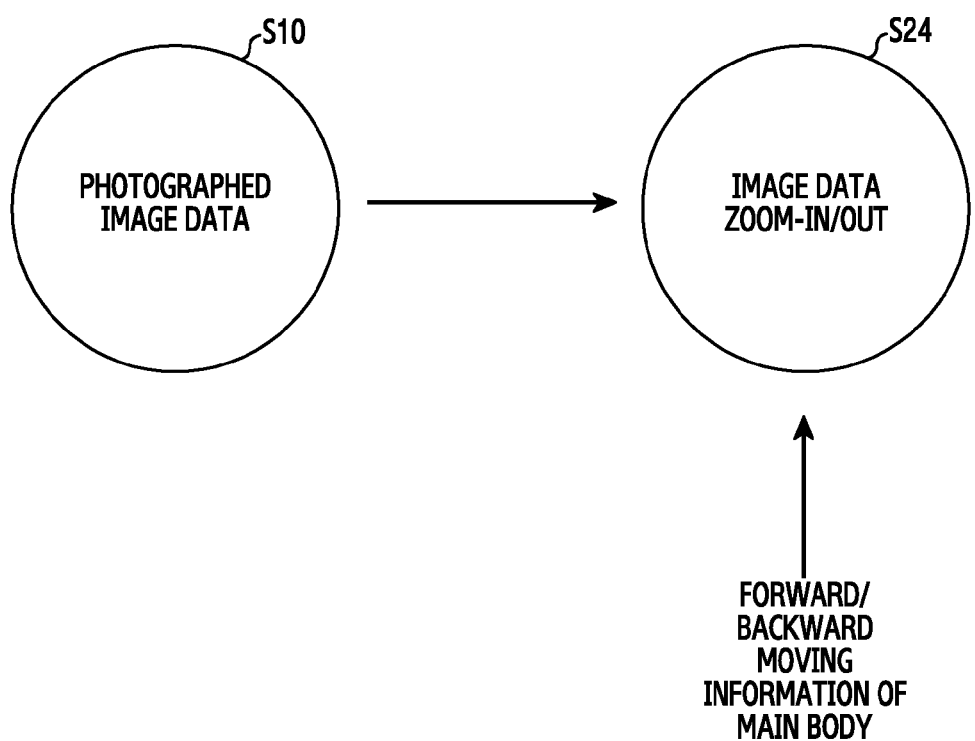
FIG. 4B is a view illustrating an operation of an interchangeable-lens camera system according to another embodiment of the present disclosure.

FIG. 4B is a view illustrating an operation of an interchangeable-lens camera system according to another embodiment of the present disclosure. Such an operation is performed by the image processor 130 illustrated in FIGS. 2a and 2b.

Referring to FIG. 4B, the image processor 130 receives photographed image data from the image sensor 120 at step S10. The image processor 130 zooms in/out the received photographed image data at step S24. For example, the image processor 130 zooms in/out the image data according to the forward/backward moving information of the main body 200. The forward/backward moving information of the main body 200 is measured by the moving trace measuring device 260, and the information for the measured forward/backward moving information of the main body 200 is transmitted through the wireless module 210 of the main body 200, and then received by the wireless module 140 of the lens unit 100.

Figure 5A:
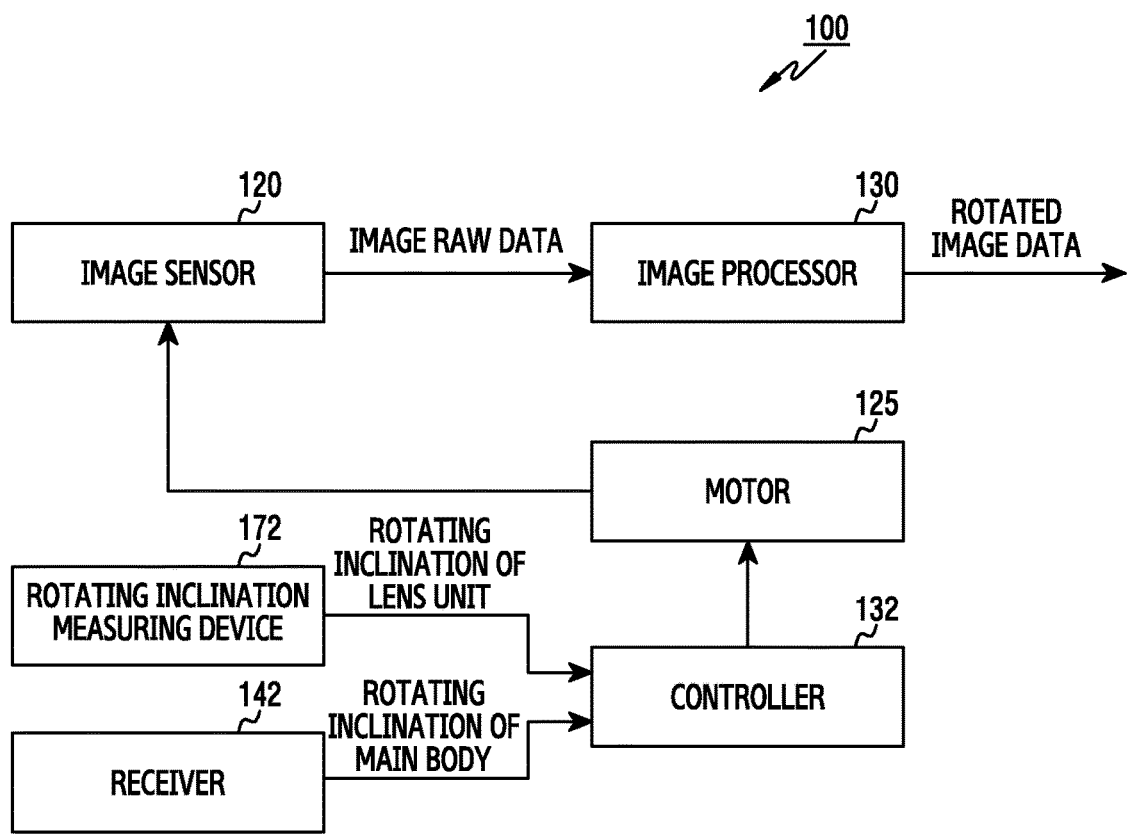
FIGS. 5A and 5B are views illustrating configuration examples of a wireless lens unit of an interchangeable-lens camera system for an operation of one embodiment of the present embodiment.
Figure 5B:
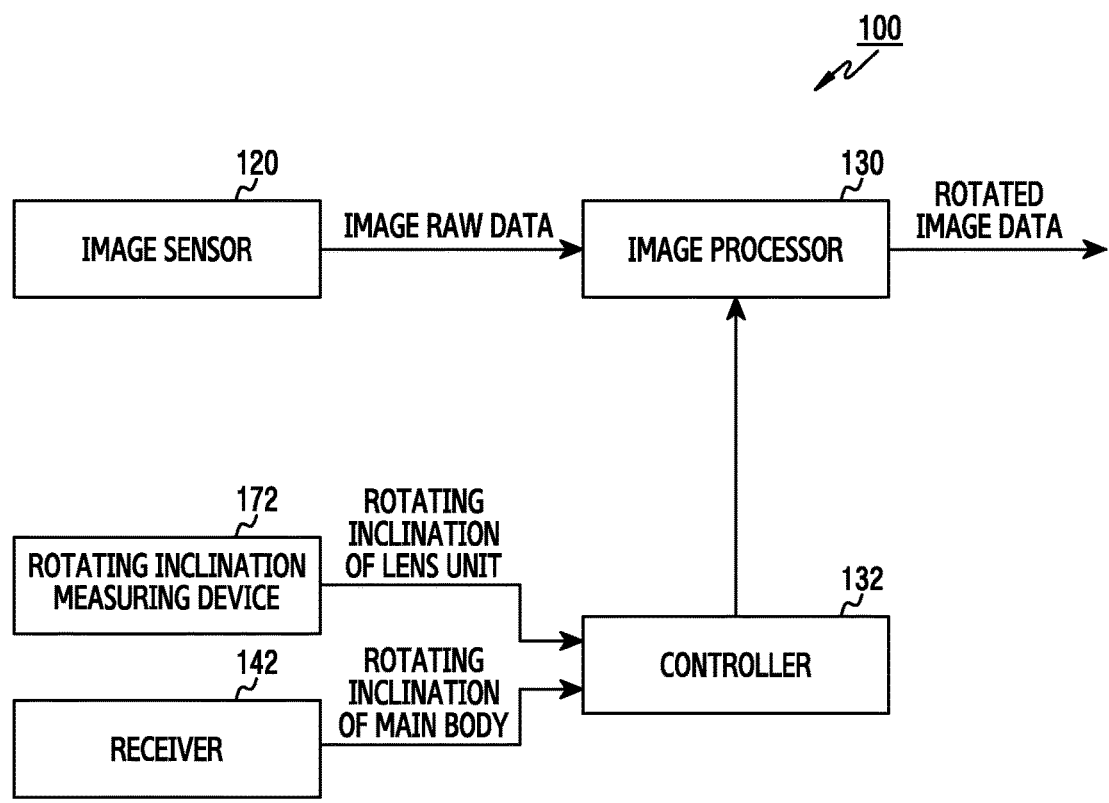

FIGS. 5A and 5B are views illustrating configuration examples of a wireless lens unit 100 of an interchangeable-lens camera system for an operation of one embodiment of the present embodiment. The configurations illustrated in FIGS. 5A and 5B are illustrative only, and other configurations may be used without departing from the scope of the present disclosure.

Referring to FIG. 5A, the wireless lens unit 100 includes an image sensor 120, an image processor 130, a motor 125, a controller 132, a receiver 142, and a rotating inclination measuring device 172. The image sensor 120 converts the light received through the optical lenses 110 illustrated in FIGS. 2a and 2b into an electric signal so as to output image data of a photographed picture or video image. The image processor 130 converts the received photographed image data. The receiver 142 is included in the wireless module 140 of the lens unit 100, and receives information for the rotating inclination of the main body 200, which was measured by the moving trace measuring device 260 of the main body 200 and then transmitted through the wireless module 210. The moving trace measuring device 260 of the main body 200 is provided to measure the rotating inclination of the main body 200, and may be implemented by a gyroscope sensor. The rotating inclination measuring device 172 is included in the moving trace measuring device 170, and is provided to measure the rotating inclination of the main body 100. The rotating inclination measuring device 172 may be implemented by a gyroscope sensor. Each of the receiver 142 and the rotating inclination measuring device 172 functions as a moving trace acquisition device configured to acquire the information for the moving traces of the main body 200 and the wireless lens unit 100.

The controller 132 is included in the image processor 130, and controls the motor 125 to mechanically rotate the image sensor 20 according to the rotating inclination of the lens unit 100 that is measured by the rotating inclination measuring device 172 and the rotating inclination of the main body 200, which is received by the receiver 142. As the motor 125 rotates the image sensor 120, rotated image data can be obtained. The motor 125 may be attached to the image sensor 120 to rotate the image sensor 120, and may be implemented by an ultrasonic motor or the like.

Referring to FIG. 5B, the wireless lens unit 100 includes an image sensor 120, an image processor 130, a controller 132, a receiver 142, and a rotating inclination measuring device 172. The image sensor 120 converts the light received through the optical lenses 110 illustrated in FIGS. 2a and 2b into an electric signal so as to output image data of a photographed picture or video image. The image processor 130 converts the received photographed image data. The receiver 142 is included in the wireless module 140 of the lens unit 100, and receives information for the rotating inclination of the main body 200, which was measured by the moving trace measuring device 260 of the main body 200 and then transmitted through the wireless module 210. The moving trace measuring device 260 of the main body 200 is provided to measure the rotating inclination of the main body 200, and may be implemented by a gyroscope sensor. The rotating inclination measuring device 172 is included in the moving trace measuring device 170, and is provided to measure the rotating inclination of the main body 100. The rotating inclination measuring device 172 may be implemented by a gyroscope sensor. Each of the receiver 142 and the rotating inclination measuring device 172 functions as a moving trace acquisition device configured to acquire the information for the moving traces of the main body 200 and the wireless lens unit 100.

The controller 132 is included in the image processor 130, and calculates a rotating amount based on the rotating inclination of the lens unit 100 that is measured by the rotating inclination measuring device 172 and the rotating inclination of the main body 200 that is received by the receiver 142, and then transfers the rotating amount to the image processor 130. The image processor 130 rotates the image data received from the image sensor 120, and then outputs the rotated image data. In rotating the image data, a coordinate conversion is applied to the received image data so as to rotate the image data.

Figure 6:
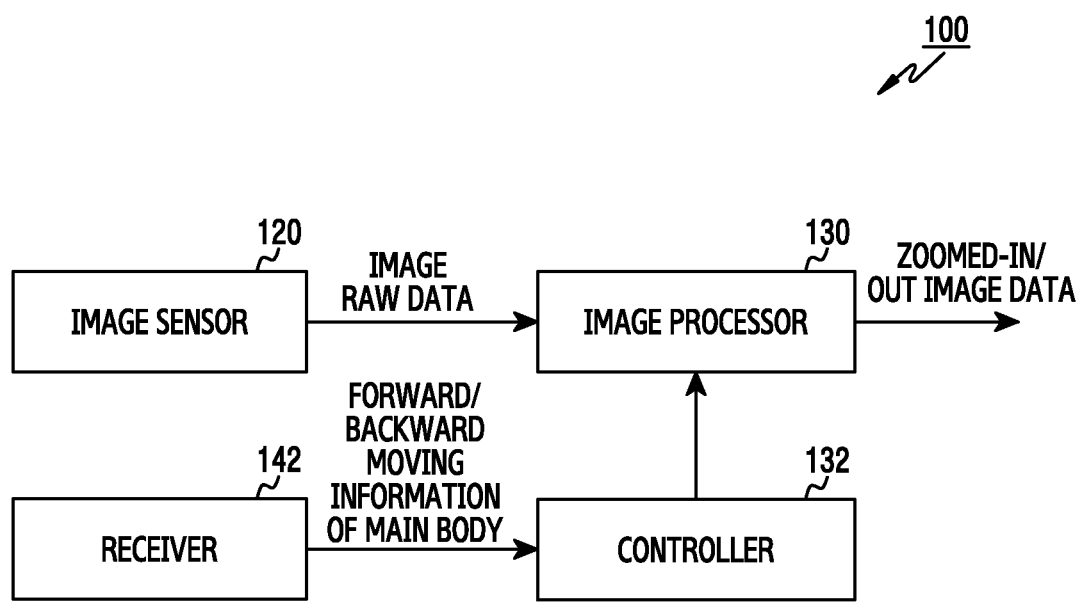
FIG. 6 is a view illustrating a configuration example of a wireless lens unit of an interchangeable-lens camera system for an operation of another embodiment of the present embodiment.

FIG. 6 is a view illustrating a configuration example of a wireless lens unit 100 of an interchangeable-lens camera system for an operation of another embodiment of the present embodiment. The configuration illustrated in FIG. 6 is illustrative only, and other configurations may be used without departing from the scope of the present disclosure.

Referring to FIG. 6, the wireless lens unit 100 includes an image sensor 120, an image processor 130, a controller 132, and a receiver 142. The image sensor 120 converts the light received through the optical lenses 110 illustrated in FIGS. 2a and 2b into an electric signal so as to output image data of a photographed picture or video image. The image processor 130 converts the received photographed image data. The receiver 142 is included in the wireless module 140 of the lens unit 100, and receives information for the forward/backward movement of the main body 200, which was measured by the moving trace measuring device 260 of the main body 200 and then transmitted through the wireless module 210. The moving trace measuring device 260 of the main body 200 is provided to measure the forward/backward movement of the main body 200, and may be implemented by an acceleration sensor. The receiver 142 functions as a moving trace acquisition device configured to acquire the information for the moving trace of the main body 200. The controller 132 is included in the image processor 130. The controller 132 determines a zoom-in/out amount according to the forward/backward movement information of the main body 200 received by the receiver 412 and transfers the zoom-in/out amount to the image processor 130. The image processor 130 zooms in/out the image data received from the image sensor 120 based on the zoom-in/out amount obtained from the controller 132, and outputs the zoomed-in/out image data. For example, when the acceleration sensor value, which indicates the moving direction of the main body 200, is positive (+), the image processor 130 zooms in the image data, and when the acceleration sensor value, which indicates the moving direction of the main body 200, is negative (−), the image processor 130 zooms out the image data.

In another embodiment, the controller 132 zooms in or zooms out the image data output from the image sensor 120 by increasing or decreasing the focal distance of the lens control unit 150 illustrated in FIGS. 2a and 2b, according to the acceleration sensor value that indicates the moving direction of the main body 200. For example, when the acceleration sensor value, which indicates the moving direction of the main body 200, is positive (+), the controller 132 zooms in the image data by increasing the focal distance of the lens control unit 150, and when the acceleration sensor value, which indicates the moving direction of the main body 200, is negative (−), the controller 132 zooms out the image data by decreasing the focal distance of the lens control unit 150.

Figure 7:
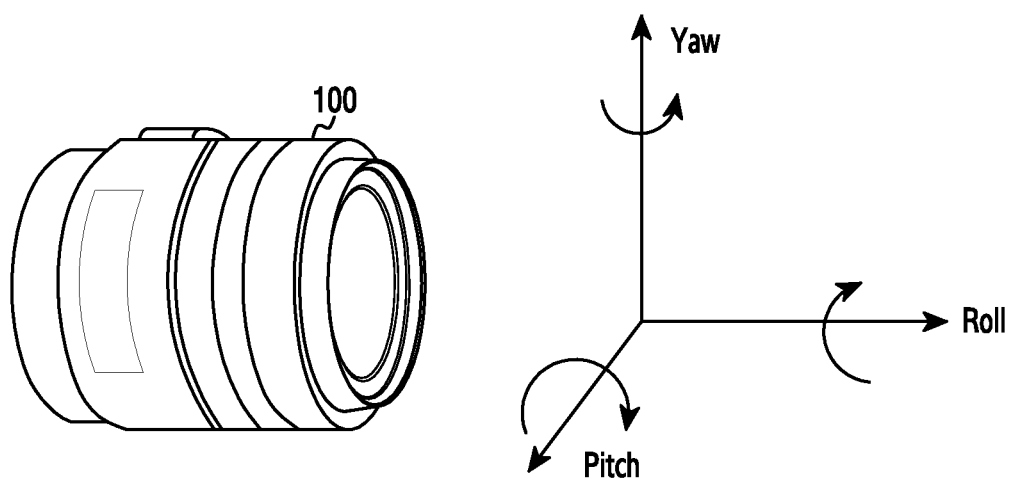
FIG. 7 is a view for describing a rotation measurement operation by a wireless lens unit for an image data rotating operation according to one embodiment of the present disclosure.

FIG. 7 is a view for describing a rotation measuring operation by a wireless lens unit 100 for an image data rotating operation according to one embodiment of the present disclosure. A moving trace measuring device 170, which is mounted on the wireless lens unit 100 illustrated in FIGS. 2a and 2b, may be implemented by a gyroscope sensor.

Referring to FIG. 7, the moving trace measuring device 170, which is mounted on the wireless lens unit 100, measures Yaw, Roll, and Pitch, which are rotating information items of the x-axis, y-axis, and z-axis, respectively. For example, when the lens unit 100 is rotated with reference to the Roll axis, the composition of a picture or video image may be changed. Thus, the rotating inclination of the lens unit 100 may be measured with reference to the Roll axis, and the measurement value may be used for changing the composition of a picture or video image. While the descriptions are made with reference to an example of rotating the rotating inclination of the lens unit 100 with reference to the Roll axis, the scope of the present disclosure is not limited thereto. As another example, the Yaw axis or the Pitch axis may be the reference axis for measurement depending on the gyroscope sensor mounting position within the wireless lens unit 100.

Figure 8:
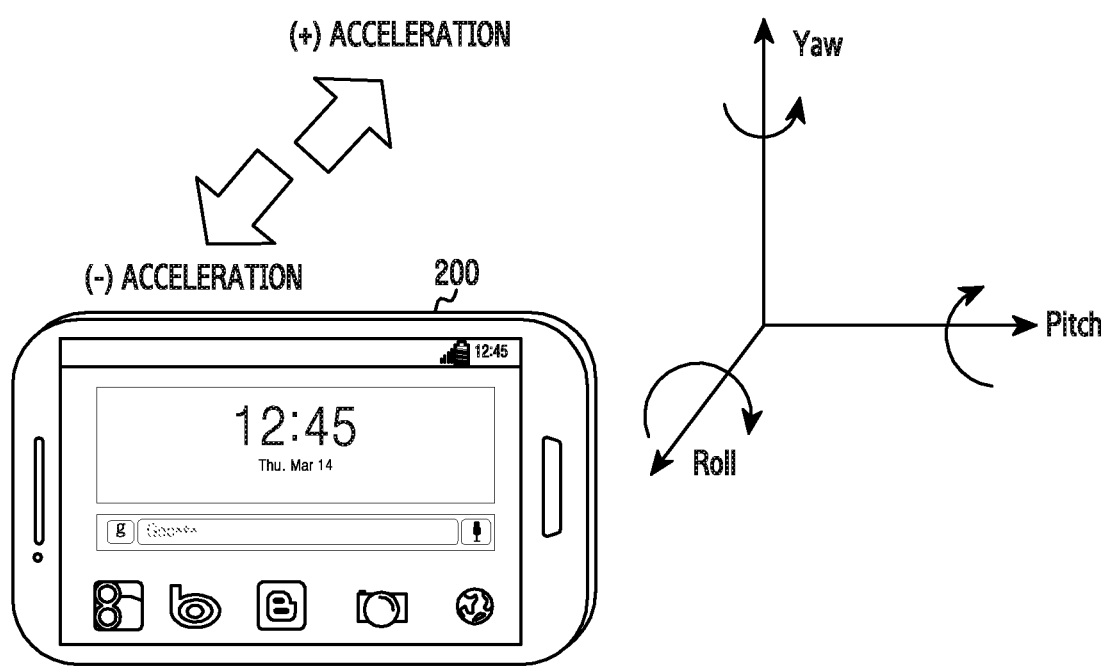
FIG. 8 is a view for describing rotation measurement and acceleration measurement operations by a main body for image data rotating and zoom processing operations according to embodiments of the present disclosure.

FIG. 8 is a view for describing rotation measurement and acceleration measurement operations by a main body 200 for image data rotation and zooming operations according to embodiments of the present disclosure. The rotation measurement and acceleration measurement operations by the moving trace measuring device 260 mounted on the main body 200 illustrated in FIGS. 2a and 2b may be implemented by a gyroscope sensor and an acceleration sensor.

Referring to FIG. 8, the moving trace measuring device 260, which is mounted on the wireless lens unit 100, measures Yaw, Roll, and Pitch, which are rotating information items of the x-axis, y-axis, and z-axis, respectively. For example, when the lens unit 100 is rotated with reference to the Roll axis, the composition of a picture or video image may be changed. Thus, the rotating inclination of the lens unit 100 may be measured with reference to the Roll axis, and the measurement value may be used for changing the composition of a picture or video image. While the descriptions are made with reference to an example of rotating the rotating inclination of the main body 200 with reference to the Roll axis, the scope of the present disclosure is not limited thereto. As another example, the Yaw axis or the Pitch axis may be the reference axis for measurement depending on the gyroscope sensor mounting position within the wireless lens unit 100.

In addition, the moving trace measuring device 260 mounted on the wireless lens unit 100 measures the forward/backward movement information of the main body 200 through an acceleration sensor. For example, when the main body 200 moves forward, the moving trace measuring device 260 measures the acceleration having the positive (+) symbol. As another example, when the main body 200 moves backward, the moving trace measuring device 260 measures the acceleration having the negative (−) symbol.

According to the present disclosure, when the wireless lens unit 100 and the main body 200 are separated from each other in the interchangeable-lens camera, the wireless lens unit 100 and the main body 200 activate the wireless modules 140 and 210, respectively, and operate while exchanging a camera control message, a picture, or a video image through a wireless link. In the case where the wireless lens unit 100 and the main body 200 are separated from each other, the main body 200 and the wireless lens unit 100 turn ON the gyroscope sensor to measure posture information periodically in order to control the composition of a picture or video image in the main body 200. The main body 200 and the wireless lens unit 100 calculate how much the main body 200 and the wireless lens unit 100 are inclined with reference to a horizontal axis based on the Roll values that are measured by the main body 200 and the wireless lens unit 100, respectively. According to an embodiment of the present disclosure, when the wireless lens unit 100 and the main body 200 are separated from each other, the composition of a picture or video image photographed by the wireless lens unit 100 cannot be controlled through the main body 200. Instead, according to the embodiment of the present disclosure, the composition of a photographed picture or video image can be controlled by rotating the picture or video image photographed by the wireless lens unit 100 by the measurement value.

Specifically, assuming that the Roll rotation amounts measured by the main body 200 and the wireless lens unit 100 are $\theta_{Roll\_Body}$ and $\theta_{Roll\_Lens}$, respectively, the composition control according to the inclination of the horizontal axis of the main body 200 is enabled by rotating the picture or video image photographed by the wireless lens unit 100 by a difference $\theta_{Roll\_Rel}$ between the rotation amount measured by the main body 200 and the rotation amount measured by the wireless lens unit 100, as represented in Equation 1.

$$\theta_{Roll\_Rel} = \theta_{Roll\_Body} - \theta_{Roll\_Lens} \quad (1)$$

When the image received by the wireless lenses 110 is rotated by $\theta_{Roll\_Rel}$, which is the value calculated by Equation 1, the composition can be controlled in the main body 200 as desired.

The photographed picture or video image can be rotated by $\theta_{Roll\_Rel}$ through a method of mechanically rotating an image sensor, or a method of implementing through image processing.

Figure 9:
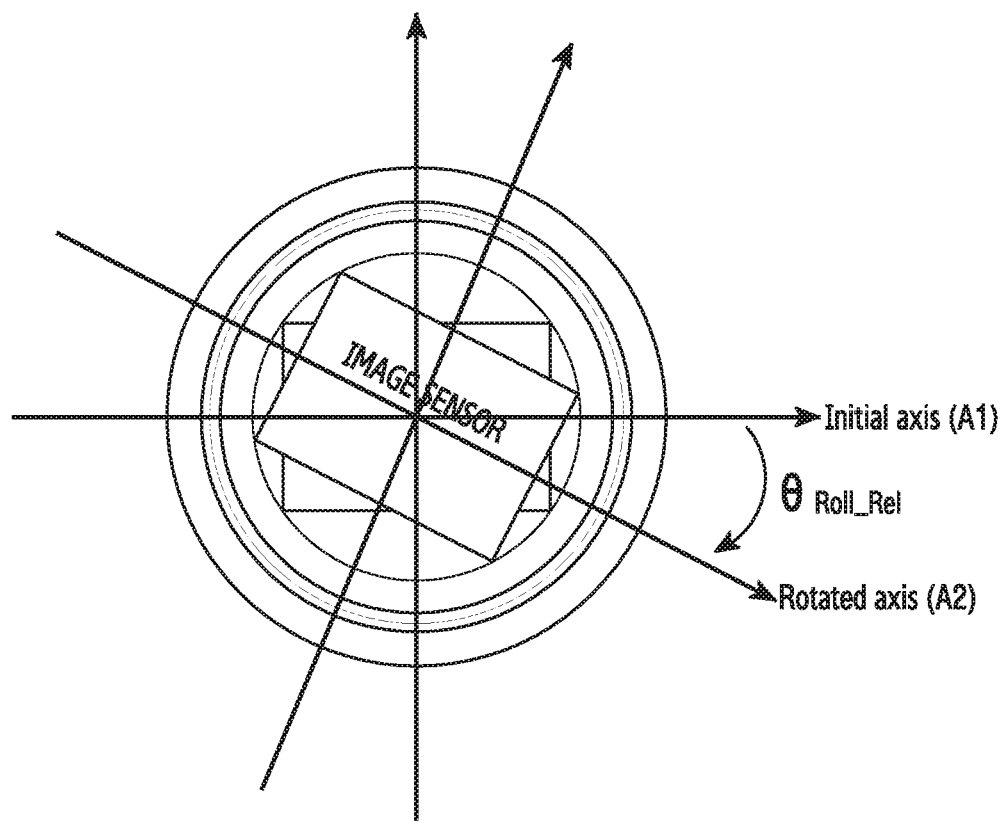
FIG. 9 is a view for describing a method of mechanically rotating an image sensor of a wireless lens unit for an image data rotating operation according to one embodiment of the present disclosure.

FIG. 9 is a view for describing a method of mechanically rotating an image sensor of a wireless lens unit 100 for an image data rotating operation according to one embodiment of the present disclosure.

Referring to FIG. 9, in the case where the image sensor 120 of the wireless lens unit 100 is coupled to the motor 125 and the image sensor 120 can be controlled through the motor 125 as illustrated in FIG. 2B, the composition of the picture or video image can be adjusted by rotating the image sensor 120 through the motor 125 by the difference between the measured Roll values of the main body 200 and the wireless lens unit 100, $\theta_{Roll\_Rel}$, as illustrated in FIG. 9. That is, the composition of the photographed picture of video image is changed by the amount adjusted through the main body 200 by the user.

An image processing method, which is another method for controlling a composition of a picture or video image, can be implemented by applying a coordinate conversion. A method of obtaining a rotated coordinate image $(x_{rot}, y_{rot})$ by rotating an arbitrary coordinate $(x_{org}, y_{org})$ of an image entering into the image sensor 120 by $\theta_{Roll\_Rel}$ is represented as Equation 2.

$$\begin{pmatrix} x_{rot} \\ y_{rot} \end{pmatrix} = \begin{pmatrix} \cos\theta_{Roll\_Rel}, & -\sin\theta_{Roll\_Rel} \\ \sin\theta_{Roll\_Rel}, & \cos\theta_{Roll\_Rel} \end{pmatrix} \cdot \begin{pmatrix} x_{org} \\ y_{org} \end{pmatrix} \quad (2)$$

Referring to Equation 2, for example, picture data rotated by $\theta_{Roll\_Rel}$ can be obtained by moving the picture data of a pixel of $(x_{org}, y_{org})$ to $(x_{rot}, y_{rot})$. The rotation of the picture can be implemented through such image processing. Since cropping may occur in such an image conversion process, it is proper to use an image sensor that is larger than the desired picture size in order to maintain the resolution of the picture.

Figure 10:
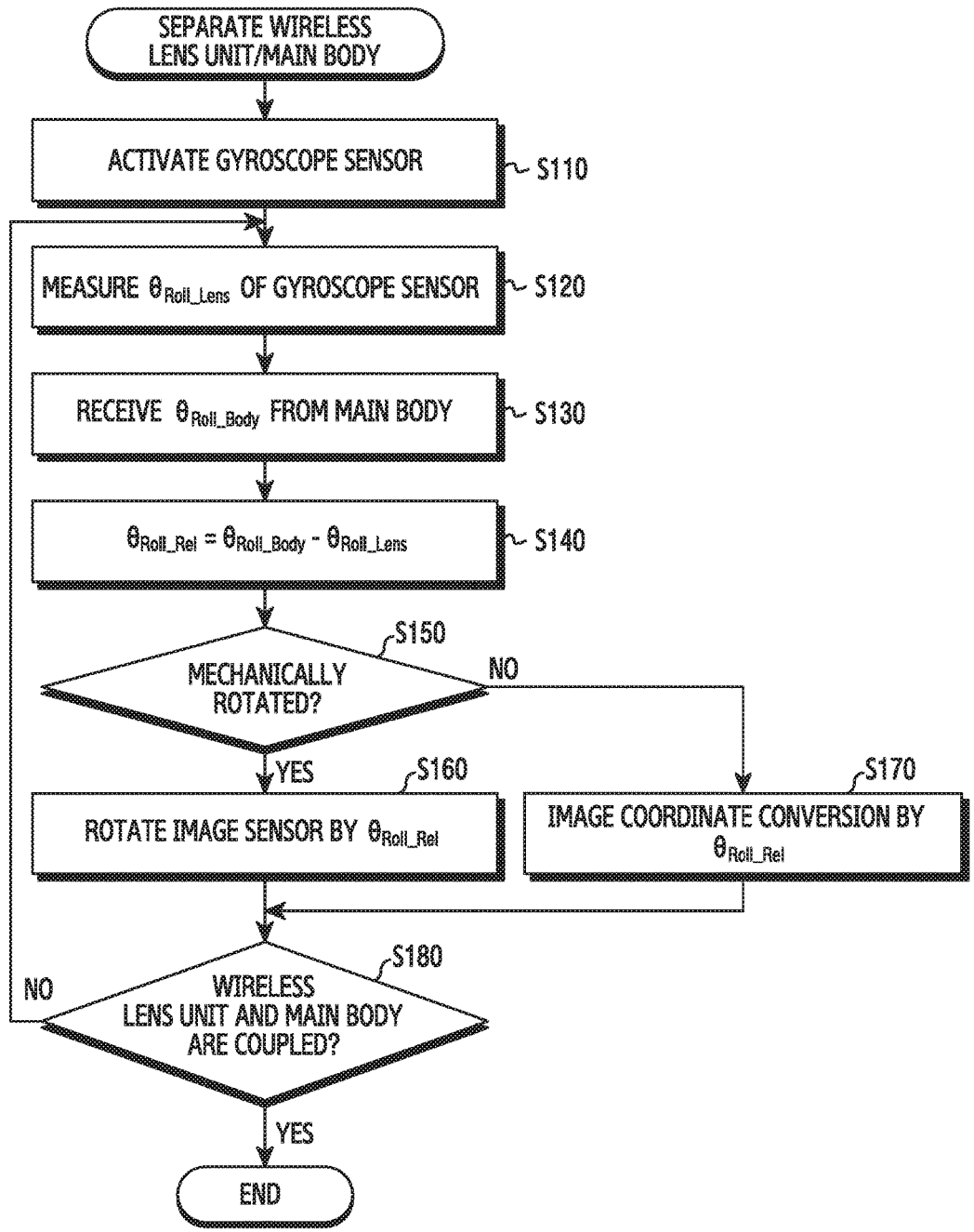
FIG. 10 is a view illustrating a processing flow by a wireless lens unit for an image data rotating operation according to one embodiment of the present disclosure.

FIG. 10 is a view illustrating a processing flow by a wireless lens unit 100 for an image data rotating operation according to one embodiment of the present disclosure. This processing flow provides a method of controlling a composition by using the main body 200 even in the case where the wireless lens unit 100 and the main body 200 are separated from each other. The configuration illustrated in FIG. 10 is illustrative only, and other configurations may be used without departing from the scope of the present disclosure.

Referring to FIG. 10, at step S110, a gyroscope sensor serving as the moving trace measuring device 170 mounted on the wireless lens unit 100 is activated. At step S120, the wireless lens unit 100 measures Roll information of the gyroscope sensor, $\theta_{Roll\_Lens}$. At step S130, the wireless lens unit 100 receives Roll information of the gyroscope sensor, $\theta_{Roll\_Body}$, from the main body 200. As step S140, the wireless lens unit 100 calculates the difference $\theta_{Roll\_Rel}$ between the received information $\theta_{Roll\_Body}$ and the measured information $\theta_{Roll\_Lens}$. At step S150, the wireless lens unit 100 determines a rotating method of an image. If the lens unit 100 provides the mechanical rotation of the image sensor 120, at step S160, the wireless lens unit 100 rotates the image sensor 120 by $\theta_{Roll\_Rel}$ using the motor 125. If the lens unit 100 does not provide the mechanical rotation of the image sensor 120, at step S170, the wireless lens unit 100 rotates the image by $\theta_{Roll\_Rel}$ using a coordinate conversion equation as represented by Equation 2. At step S180, the wireless lens unit 100 determines whether the wireless lens unit 100 and the main body 200 are coupled to each other. When it is determined that the wireless lens unit 100 and the main body 200 are coupled to each other, the wireless lens unit 100 terminates the operation, and when it is determined that the wireless lens unit 100 and the main body 200 are not coupled to each other, the wireless lens unit 100 returns to step S120 and performs the operations of steps S120 to S170.

Figure 11:
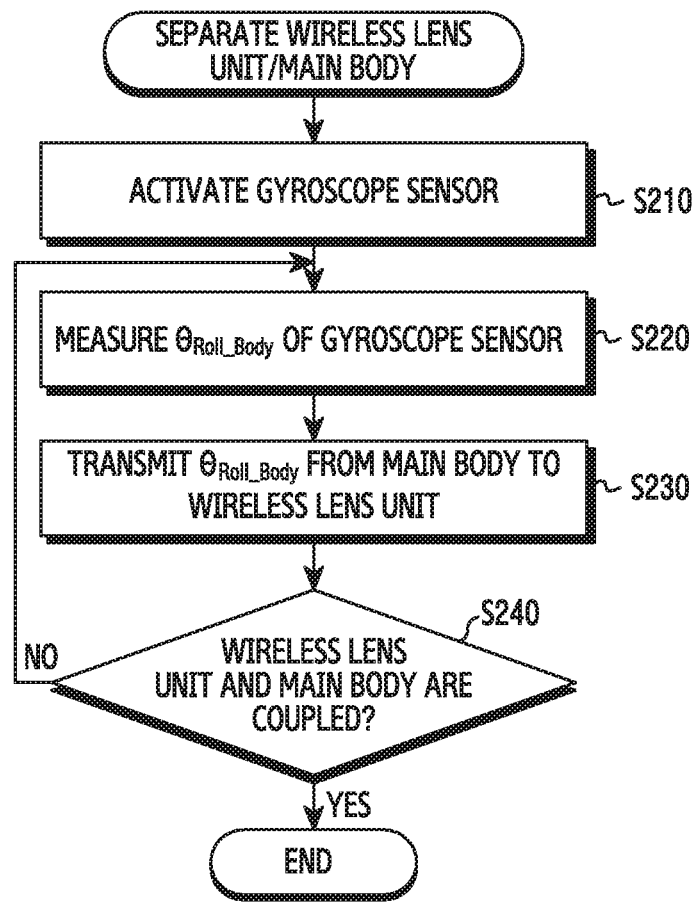
FIG. 11 is a view illustrating a processing flow by a main body for an image data rotating operation according to one embodiment of the present disclosure.

FIG. 11 is a view illustrating a processing flow by the main body 200 for an image data rotating operation according to one embodiment of the present disclosure. This processing flow provides a method of controlling a composition by using the main body 200 even in the case where the wireless lens unit 100 and the main body 200 are separated from each other. The configuration illustrated in FIG. 11 is illustrative only, and other configurations may be used without departing from the scope of the present disclosure.

Referring to FIG. 11, at step S210, a gyroscope sensor serving as the moving trace measuring device 260 mounted on the main body 200 is activated. At step S220, the main body 200 measures Roll information of the gyroscope sensor, $\theta_{Roll\_Body}$. At step S230, the main body 200 transmits Roll information of the gyroscope sensor, $\theta_{Roll\_Body}$, to the wireless lens unit 100. At step S240, the main body 200 determines whether the wireless lens unit 100 and the main body 200 are coupled to each other. When it is determined that the wireless lens unit 100 and the main body 200 are coupled to each other, the main body 200 terminates the operation, and when it is determined that the wireless lens unit 100 and the main body 200 are not coupled to each other, the main body 200 returns to step S220 and performs the operations of steps S220 and S230.

The processes illustrated in FIGS. 10 and 11 are periodically and continuously repeated in the case where the processes are set such that the user controls a composition based on the main body 200 in the state where the lens unit 100 and the main body 200 are separated from each other. When the main body 200 and the wireless lens unit 100 are coupled to each other or when the composition control setting function based on the main body 100 is turned OFF, the processes illustrated in FIGS. 10 and 11 are stopped. In such a case, the image processor 130 of FIGS. 2a and 2b may initialize the mechanical rotation or the image processing such that $\theta_{Roll\_Rel}$ becomes zero ($\theta_{Roll\_Rel}$=0).

Meanwhile, when performing the above-described composition control operation based on the main body 200, the gyroscope sensor of the wireless lens unit 100 may not be included. In such a case, in calculating $\theta_{Roll\_Rel}$, it is assumed that $\theta_{Roll\_Lens}$=0, and, based on this, the image sensor 120 of the lens unit 100 is rotated or an image itself is rotated.

Figure 12:
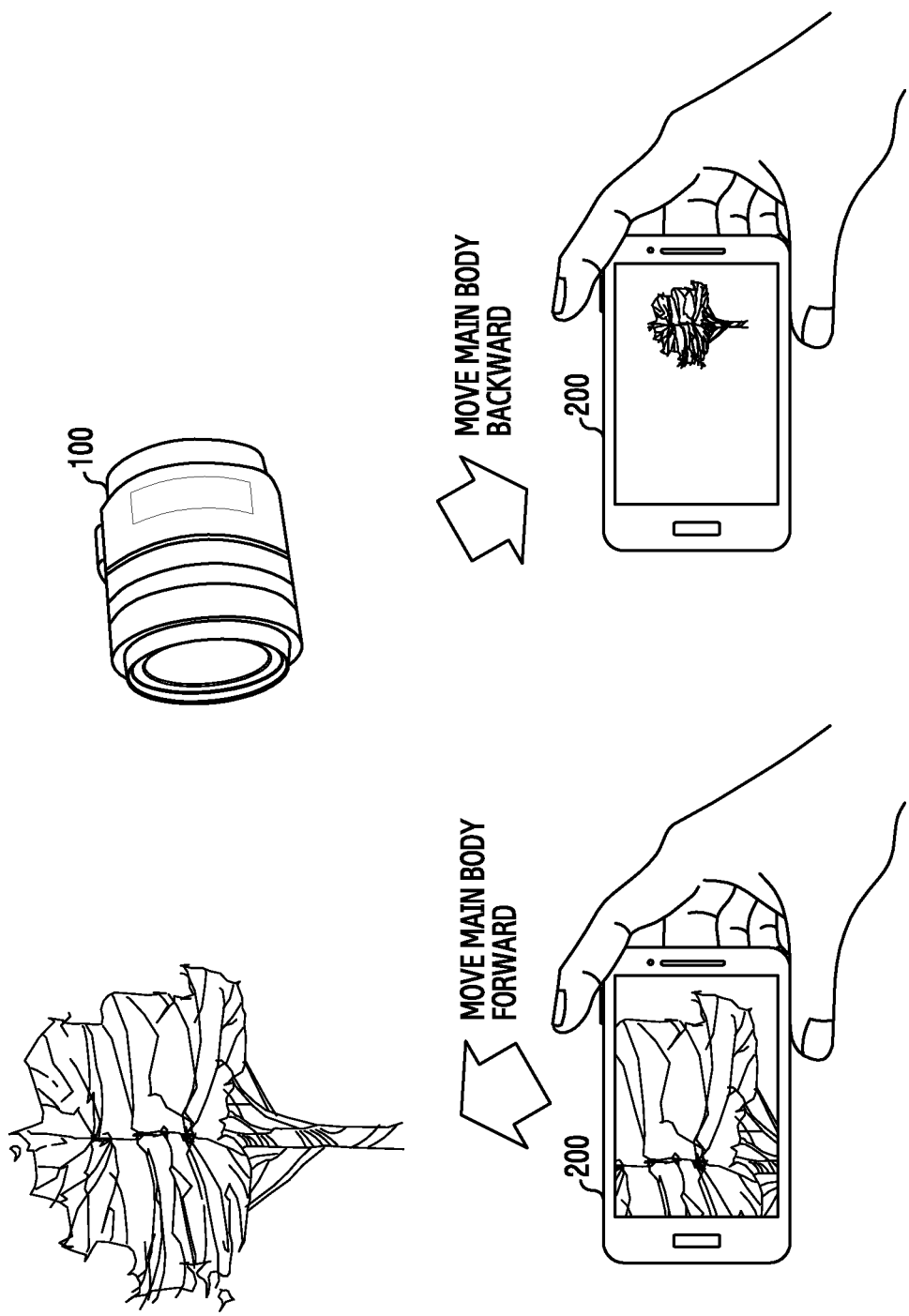
FIG. 12 is a view for describing a mutual operation of a wireless lens unit and a main body for an image data zoom processing operation according to another embodiment of the present disclosure.

FIG. 12 is a view for describing an interaction of the wireless lens unit 100 and the main body 200 for an image data zoom processing operation according to another embodiment of the present disclosure. According to such an embodiment of the present disclosure, when the main body 200 and the wireless lens unit 100 are separated from each other in an interchangeable-lens camera, the user controls zoom-in/out processing for the image data through the main body 200. According to one embodiment, the zoom-in/out processing may be implemented using an acceleration sensor or a similar sensor. The zoom-in/out processing may also be implemented through a User Interface (UI) that is implemented in a display.

Referring to FIG. 12, when the user moves the main body 200 forward, an acceleration sensor mounted on the main body 200 as the moving trace measuring device 260 measures a positive (+) acceleration. On the contrary, when the user moves the main body 200 backward, an acceleration sensor mounted on the main body 200 as the moving trace measuring device 260 measures a negative (−) acceleration. The main body 200 transmits the measured acceleration value or the symbol of the acceleration to the wireless lens unit 100 through a wireless link. Then, the wireless lens unit 100 controls the lens control unit 150 using the received acceleration information so as to adjust the focal distance of the optical lenses 110 and performs zoom-in/out with respect to a photographed screen.

When the main body 200 is moved forward in the state where the wireless lens unit 100 and the main body 200 are separated from each other, the wireless lens unit 100 increases the focal distance of the optical lenses 110 by the positive (+) acceleration measured by the acceleration sensor. Then, the wireless lens unit 100 zooms in the photographed image data, and transmits the zoomed-in image data to the main body 200. As a result, the main body 200 can obtain a zoomed-in screen. On the contrary, when the main body 200 is moved backward while in the state where the wireless lens unit 100 and the main body 200 are separated from each other, the wireless lens unit 100 decreases the focal distance of the optical lenses 110 by the negative (+) acceleration measured by the acceleration sensor. Then, the wireless lens unit 100 zooms out the photographed image data, and transmits the zoomed-out image data to the main body 200. As a result, the main body 200 can obtain a zoomed-out screen. When the zoom processing based on the focal distance change of the optical lenses 110 is not possible any more, a digital zoom may be used.

Meanwhile, in order to perform a zoom-in/out processing function according to the present disclosure, the main body 200 may be provided with a gesture recognition button. Only when the gesture recognition button is pushed, zoom-in/out is adapted to be executed according to the forward or backward movement of the main body 200. In one embodiment, the gesture recognition button may be implemented as a UI on the display 250 in which a touch screen is included. In another embodiment, the gesture recognition button may be implemented as a mechanical button.

Figure 13:
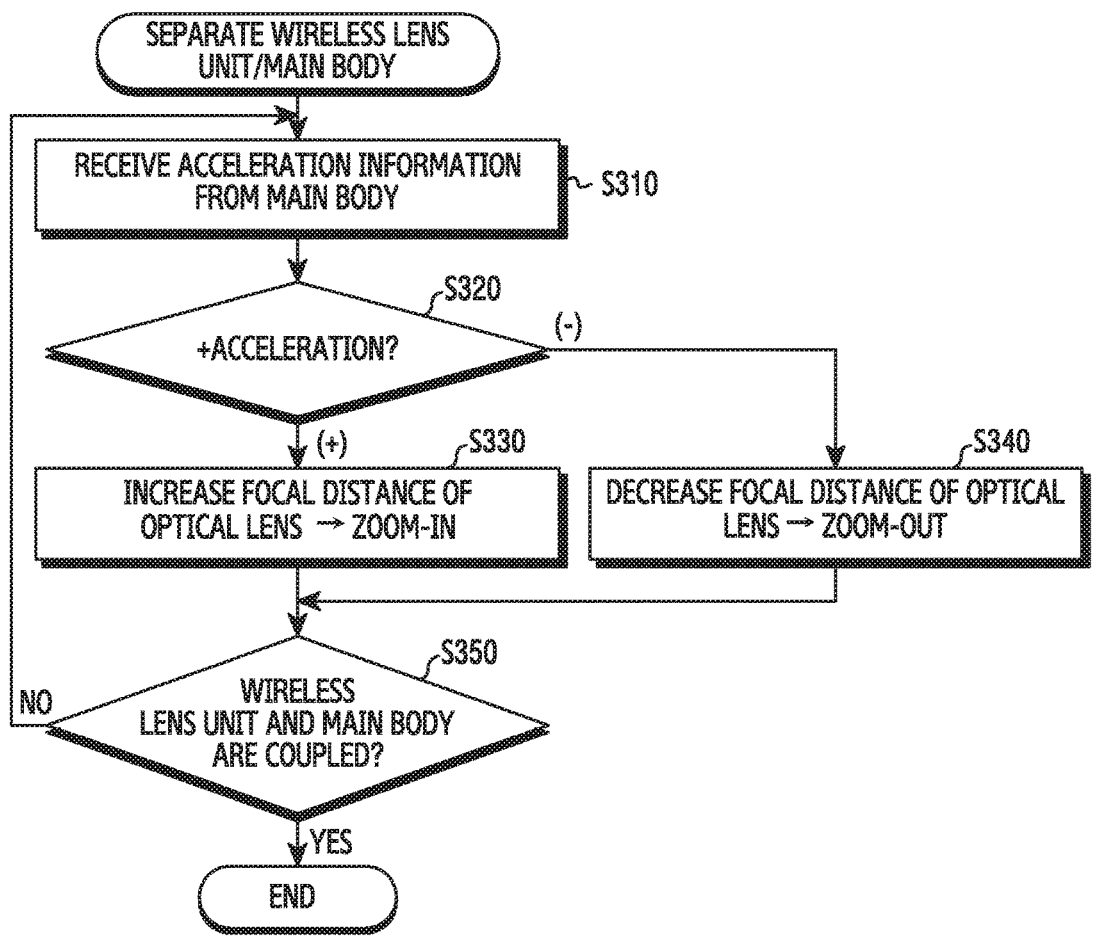
FIG. 13 is a view illustrating a processing flow by a wireless lens unit for an image data zoom processing operation according to one embodiment of the present disclosure.

FIG. 13 is a view illustrating a processing flow by a wireless lens unit 100 for an image data zoom processing operation according to one embodiment of the present disclosure. The processing flow corresponds to the processing operation of the wireless lens unit 100 in the case where the user controls zoom-in/out processing for the image data through the main body 200 in the state where the main body 200 and the wireless lens unit 100 are separated from each other in an interchangeable-lens camera. The configuration illustrated in FIG. 13 is illustrative only, and other configurations may be used without departing from the scope of the present disclosure.

Referring to FIG. 13, at step S310, the wireless lens unit 100 receives acceleration information that corresponds to the acceleration sensor value measured by the main body 200. The acceleration information may be an acceleration symbol or an acceleration value. After receiving the acceleration information, the wireless lens unit 100 changes the focal distance of the optical lenses 110 included in the wireless lens unit 100 according to the acceleration symbol or value. In the case where it is confirmed that the acceleration measured by the acceleration sensor of the main body 200 is positive (+) ((+) at step S320), at step S330, the wireless lens unit 100 increases the focal distance of the optical lenses 110 so as to zoom in the image data. In the case where it is confirmed that the acceleration measured by the acceleration sensor of the main body 200 is negative (−) ((−) at step S320), at step S340, the wireless lens unit 100 decreases the focal distance of the optical lenses 110 so as to zoom out the image data. In one embodiment, when the acceleration value is large, the focal distance conversion is performed more rapidly, and when the acceleration value is small, the focal distance conversion is performed slowly. Thereafter, the zoomed-in/out image data is transmitted to the main body 200, and as a result, the screen displayed on the display 250 of the main body 200 is zoomed in/zoomed out. At step S350, the wireless lens unit 100 determines whether the wireless lens unit 100 and the main body 200 are coupled to each other. When it is determined that the wireless lens unit 100 and the main body 200 are coupled to each other, the wireless lens unit 100 terminates the operation, and when it is determined that the wireless lens unit 100 and the main body 200 are not coupled to each other, the wireless lens unit 100 returns to step S310 and performs the operations of steps S310 to S340.

Figure 14:
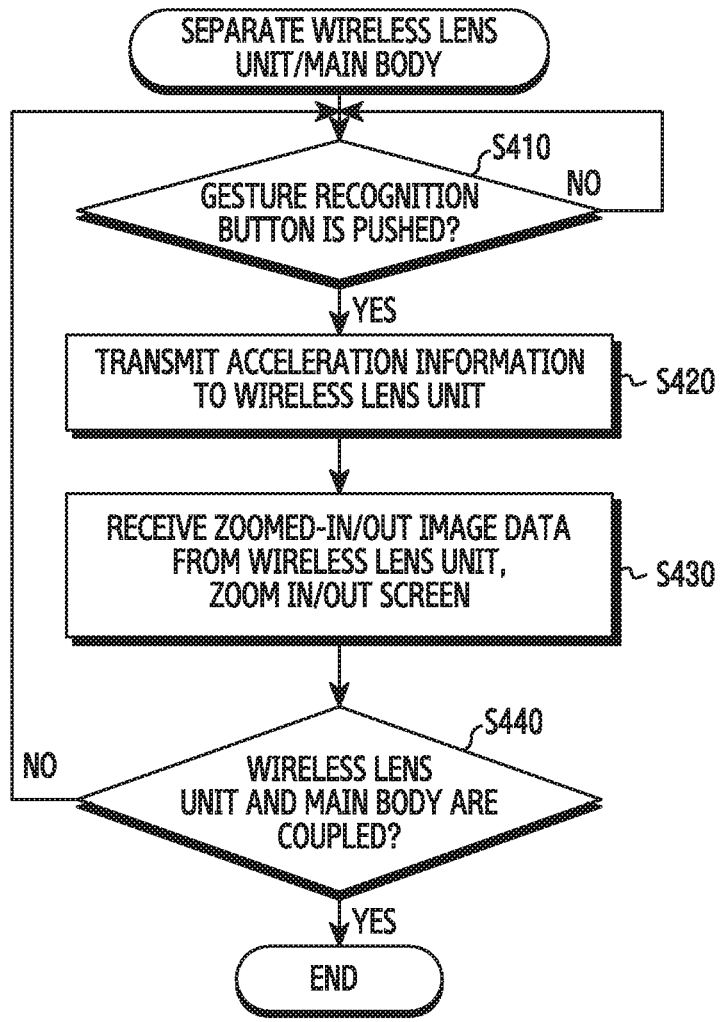
FIG. 14 is a view illustrating a processing flow by a main body for an image data zoom processing operation according to one embodiment of the present disclosure.

FIG. 14 is a view illustrating a processing flow by the main body 200 for an image data zoom processing operation according to one embodiment of the present disclosure. The processing flow corresponds to the processing operation of the main body 200 in the case where the user controls the zoom-in/out processing for image data through the main body 200 in the state where the main body 200 and the wireless lens unit 100 are separated from each other in an interchangeable-lens camera. The configuration illustrated in FIG. 14 is illustrative only, and other configurations may be used without departing from the scope of the present disclosure.

Referring to FIG. 14, at step S410, the main body 200 determines whether the gesture recognition button is pushed. When it is determined that the gesture recognition button is pushed, at step S420, the main body 200 measures the value of the acceleration sensor, and transmits the acceleration information, such as a measured acceleration symbol or acceleration value, to the wireless lens unit 100. Then, after receiving the acceleration information, the wireless lens unit 100 changes the focal distance of the optical lenses 110 included in the wireless lens unit 100 according to the acceleration symbol or value so as to zoom in or zoom out the photographed image data. The image data zoomed in/zoomed out in this way is transmitted to the main body 200.

At step S430, the main body 200 receives zoomed-in/out image from the wireless lens unit 100, and zooms in/out a screen displayed on the display 250. At step S440, the main body 200 determines whether the wireless lens unit 100 and the main body 200 are coupled to each other. When it is determined that the wireless lens unit 100 and the main body 200 are coupled to each other, the main body 200 terminates the operation, and when it is determined that the wireless lens unit 100 and the main body 200 are not coupled to each other, the main body 200 returns to step S410 and performs the operations of steps S410 to S430.

The processes illustrated in FIGS. 13 and 14 and described above may be executed when the gesture recognition button provided in the main body 200 is pushed in the state where the wireless lens unit 100 and the main body 200 are separated from each other, and may be stopped when the wireless lens unit 100 and the main body 200 are coupled to each other. Unlike the embodiment illustrated in FIGS. 13 and 14, as illustrated in FIG. 6, the controller 132 may zoom in/out the image data received from the image sensor 120 according to the forward/backward movement information of the main body 200 received by the receiver 142, thereby outputting zoomed-in/out image data. For example, when the acceleration sensor value, which indicates the moving direction of the main body 200, is positive (+), the controller 132 zooms in the image data, and when the acceleration sensor value, which indicates the moving direction of the main body 200, is negative (−), the controller 132 zooms out the image data.

As described above, according to embodiments of the present disclosure, the wireless lens unit and the main body in an interchangeable-lens camera are provided with a moving trace measuring device, such as a gyroscope sensor or an acceleration sensor, so as to determine a moving trace, such as an inclination, a rotation, or a forward/backward movement. The wireless lens unit or the main body transfers moving trace information measured by the moving trace measuring device to the counterpart through a wireless link. The wireless lens unit or the main body combines the received trace information of the counterpart so as to determine whether to rotate, magnify, or minify the image data of a photographed picture or video image, and reflects the determination on the photographing of a picture or video image. According to one embodiment, when the main body is rotated vertically, horizontally, or with an arbitrary inclination in the state where the wireless lens unit and the main body are separated from each other, the moving trace measuring device of the main body measures the moving trace information of the main body and transmits the moving trace information to the wireless lens unit. Then, the wireless lens unit also rotates a preview video image, a photographed image, or the like vertically, horizontally, or with an arbitrary inclination, similar to the main body. According to another embodiment, when the main body is moved forward/backward in the state where the wireless lens unit and the main body are separated from each other, the moving trace measuring device of the main body measures the moving trace information of the main body and transmits the moving trace information to the wireless lens unit. Then, the wireless lens unit adjusts the focal distance of the lenses according to the movement of the main body, and zooms in/out the photographed image data. Thus, according to the embodiments of the present disclosure, a photographing composition of a picture or a video image can be efficiently changed by using the main body when photographing the picture or video image even if the wireless lens unit and the main body are separated from each other. In addition, zoom-in/out can be easily implemented by moving the main body forward/backward.

While the present disclosure has been described above with reference to restricted embodiments and drawings, the present disclosure is not limited to the above-described embodiments, and various modifications and variations may be made based on the descriptions of the embodiments by a person ordinarily skilled in the art to which the present disclosure belongs. For example, while the embodiments of the present disclosure have been described with reference to a case where the embodiments are applied to an interchangeable-lens camera system that is constituted with a wireless lens unit 100 and a main body 200, the main body 200 may not only be a camera body, but also, for example, a smart phone, a TV, a tablet PC, or a laptop PC which includes a display. The wireless lens unit 100 may also be a smart camera. As other examples, in the embodiments of the present disclosure, descriptions have been made with reference to the case in which the wireless lens unit 100 is configured as illustrated in FIG. 2A, FIG. 2B, FIG. 5A, FIG. 5B, or FIG. 6, and operates as illustrated in the flowcharts of FIG. 10 and FIG. 13, and the case in which the main body 200 is configured as illustrated in FIG. 2A or FIG. 2B, and operates as illustrated in the flowcharts of FIG. 11 and FIG. 14, but the scope of the present disclosure to be protected shall not be necessarily limited thereto. The operations according to the embodiments of the present disclosure may also be implemented by a single processor. In such a case, program commands for performing the operations implemented by various computers may be stored in a computer-readable medium. The computer readable medium may include a program command, a data file, a data structure, and the like independently or in combination. The program command may be things specially designed and configured for the present disclosure, or things that are well known to and can be used by those skilled in the related art. For example, the computer readable recoding medium includes magnetic media such as a hard disk, a floppy disk, and a magnetic tape, optical media such as a CD-ROM and a DVD, magneto-optical media such as a floptical disk, and hardware devices such as a ROM, RAM, and a flash memory, which are specially constructed in such a manner that they can store and execute a program command. Examples of the program command include a machine language code generated by a compiler and a high-level language code executable by a computer through an interpreter and the like. Therefore, the scope of the present disclosure should not be defined as being limited to the embodiments, but should be defined by the appended claims and equivalents thereof.

What is claimed is:

1. A method for operating a lens unit in a camera system that includes a main body and the lens unit, the method comprising:
   receiving, from the main body, information on a first movement of the main body;
   detecting a second movement of the lens unit; and
   converting image data photographed by the lens unit based on the first movement and the second movement,
   wherein the lens unit is detachably mounted on the main body and wirelessly connected to the main body.

2. The method of claim 1, wherein the detecting of the second movement of the lens unit comprises measuring a rotating inclination of the lens unit with respect to a predetermined reference axis.

3. The method of claim 2,
   wherein the receiving of the information on the first movement of the main body comprises receiving rotating inclination information of the main body with respect to the predetermined reference axis.

4. The method of claim 3, wherein the converting of the image data based on the first movement and the second movement comprises rotating the image data by an inclination difference between the rotating inclination of the main body and the rotating inclination of the lens unit with respect to the reference axis.

5. The method of claim 4, wherein the rotating of the image data comprises:
   rotating the image data by mechanically rotating an image sensor configured to photograph a picture by the inclination difference; or
   outputting image data having a rotated coordinate by rotating a coordinate for each pixel of the photographed image data output by the image sensor by the inclination difference.

6. The method of claim 1, wherein the receiving the information on the first movement of the main body comprises receiving information of a moving direction of the main body with respect to a predetermined reference axis.

7. The method of claim 6, wherein the converting of the image data based on the first movement and the second movement comprises zooming in or zooming out the image data based on the information of the moving direction of the main body.

8. An apparatus of a main body in a camera system that includes the main body and a lens unit, the apparatus comprising:
   a sensor configured to detect a first movement of the main body; and
   a transmitter configured to wirelessly transmit information on the first movement of the main body to the lens unit,
   wherein the first movement is used to convert image data that is photographed by the lens unit, and
   wherein the lens unit is detachably mounted on the main body and wirelessly connected to the main body.

9. The apparatus of claim 8, wherein the sensor is further configured to measure a rotating inclination of the main body with respect to a predetermined reference axis.

10. The apparatus of claim 8, wherein the sensor is further configured to measure a moving direction of the main body with respect to a predetermined reference axis.

11. A method for operating a main body in a camera system that includes the main body and a lens unit, the method comprising:
   detecting a first movement of the main body; and
   transmitting information on the first movement of the main body to the lens unit,
   wherein the first movement is used to convert image data that is photographed by the lens unit, and
   wherein the lens unit is detachably on the main body and wirelessly connected to the main body.

12. The method of claim 11, wherein the detecting of a movement of the main body comprises measuring a rotating inclination of the main body with respect to a predetermined reference axis.

13. The method of claim 11, wherein the detecting a movement of the main body comprises measuring a moving direction of the main body with respect to a predetermined reference axis.

14. An apparatus of a lens unit in a camera system that includes a main body and the lens unit, the apparatus comprising:
   a receiver configured to receive, from the main body, information on a first movement of the main body;
   a sensor configured to detect a second movement of the lens unit; and
   at least one processor configured to convert image data photographed by the lens unit based on the first movement and the second movement,
   wherein the lens unit is detachably mounted on the main body and wirelessly connected to the main body.

15. The apparatus of claim 14, wherein the sensor is further configured to measure a rotating inclination of the lens unit with respect to a predetermined reference axis.

16. The apparatus of claim 15, wherein the receiver is further configured to receive rotating inclination information of the main body with respect to the predetermined reference axis.

17. The apparatus of claim 16, wherein the sensor is further configured to rotate the image data by an inclination difference between the rotating inclination of the main body and the rotating inclination of the lens unit with respect to the predetermined reference axis.

18. The apparatus of claim 17, wherein the sensor is further configured to:
   rotate the image data by mechanically rotating an image sensor configured to photograph a picture by the inclination difference; or
   output image data having a rotated coordinate by rotating a coordinate for each pixel of the photographed image data output by the image sensor by the inclination difference.

19. The apparatus of claim 14, wherein the receiver is further configured to receive information of a moving direction of the main body with respect to a predetermined reference axis.

20. The apparatus of claim 19, wherein the at least one processor is further configured to zoom in or zoom out the image data based on the information of the moving direction.

* * * * *